Feb. 6, 1968   R. E. DOUGHTY   3,367,048
DREDGE FISHING METHOD AND APPARATUS
Filed April 23, 1965

INVENTOR
RICHARD E. DOUGHTY

BY *Walter S. Paul*

ATTORNEY

United States Patent Office 3,367,048
Patented Feb. 6, 1968

3,367,048
DREDGE FISHING METHOD AND APPARATUS
Richard E. Doughty, 529 Melrose Ave.,
Atlantic City, N.J. 08401
Filed Apr. 23, 1965, Ser. No. 450,420
4 Claims. (Cl. 37—55)

ABSTRACT OF THE DISCLOSURE

This invention comprises the use of two vessels and two dredges in a novel method of dredge fishing for clams and other shellfish, wherein one vessel tows the other at a suitable distance, as well as pulls the dredges at a corresponding distance for continuous dredging of the sea bed substantially under said other vessel by alternate dredges, the vessels being provided with winches for alternately lifting one dredge at one side of the trailing vessel for unloading it into the hold thereof while lowering the other dredge at the other side of said vessel for dredging the clams from said sea bed, until said vessel is suitably loaded, the vessels then exchanging towing and loading positions for continued dredging operations until both vessels are desirably loaded before returning to port with their cargoes.

---

Figures 1, 2:
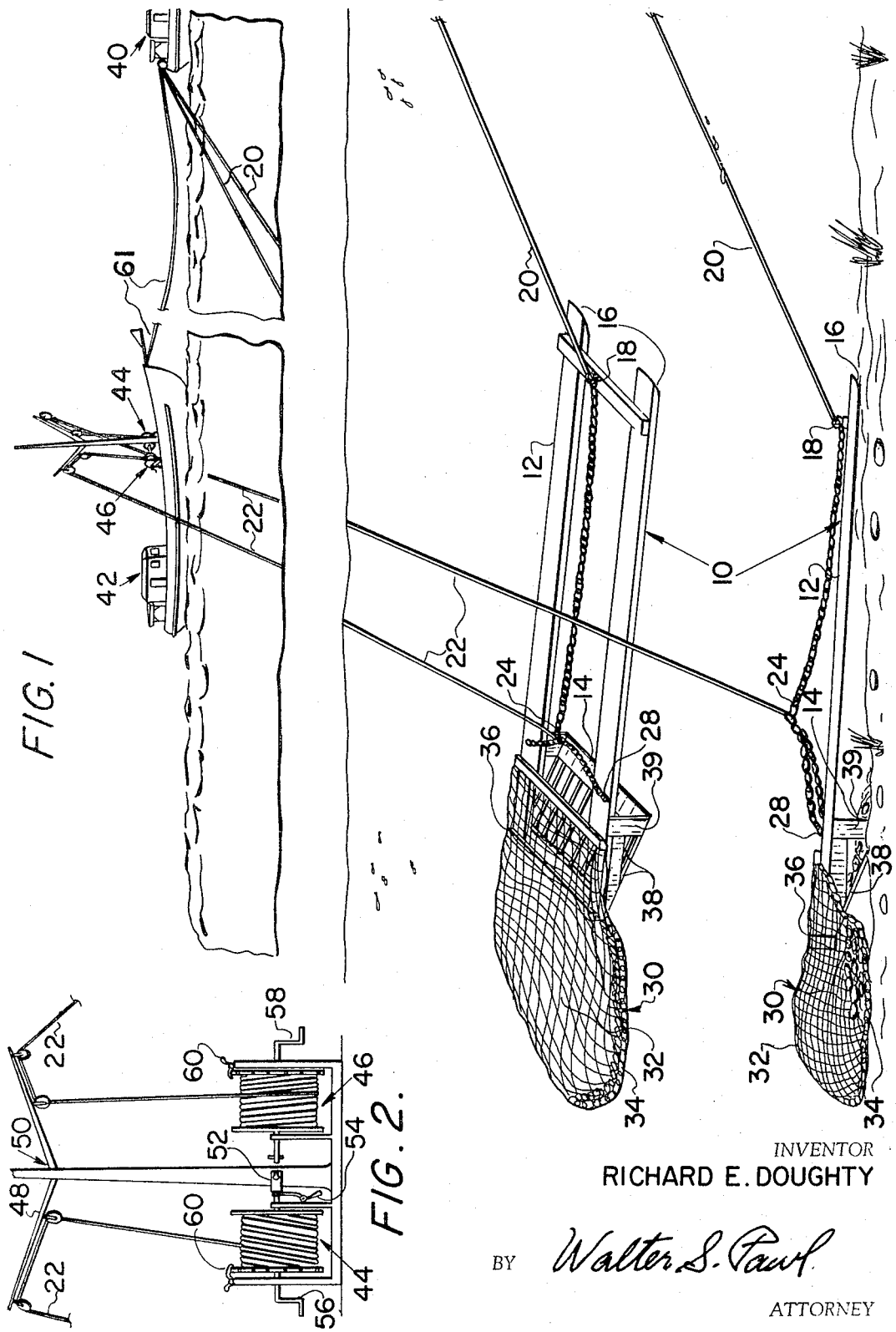

The present invention relates to clam fishing equipment and improvements in the construction and methods of operation of dredges to increase their yield with less effort on the part of the crew.

The main object is to improve the construction of the equipment used in conventional clam fishing and the methods of its use so as to obtain greater yield with less effort and in less time.

Another object is to devise a new method of fishing for clams and other shellfish, involving the use of two vessels working as a team, with two dredges, so that while one vessel tows the dredges by separate tow lines, the other alternately lowers one dredge while raising the other to unload it into the hold of this other vessel, until it is fully loaded, working directly over the oyster beds being dredged; the vessels then reversing their operations until the first towing vessel has been loaded, when both loaded vessels return to their ports.

A further object is to use the weight of one dredge to counterbalance the weight of the other during the vessel loading operations so as to reduce the torque required to haul in the loaded dredges.

A further object is to reduce the hauling-in distance by working directly over the clam beds being dredged, thus further reducing the work of hauling in the clams as well as the time required.

A further object is to provide each of the cooperating vessels with a winch for each dredge, the winches being connected when desired to operate simultaneously in reverse directions to reduce the torque required to operate them when raising the loaded dredge while lowering the empty one, due to the counterbalance between the weights of the dredges themselves.

A further object is to eliminate the necessity of using the conventional water jets in front of the scraper blade of the dredge to uncover the clams buried in the sand, by lengthening the forwardly extending skid frame of the dredges and making them heavier, so as to bring the center of gravity of the dredge well in front of the scraper blade so as to tend to keep the front end of the skid down on the floor of the clam bed, and thus to assist the scraper blade to dig into the sandy floor under the clams which are buried therein.

Other and more specific objects will appear in the following detailed description of a preferred form of the present invention as illustrated in the accompanying drawing, wherein:

FIG. 1 is a broken view of two vessels shown on a reduced scale, and two dredges of an improved form shown connected by separate tow lines to the leading vessel and by separate lift lines to winches on the trailing vessel, and FIG. 2 is a view of one form of interconnected winches with individual boom and pulley systems for each dredge operated thereby.

Clam fishing is normally done by individual dredger vessels, or vessels with dredges which are towed, usually at a considerable distance to the rear of the vessel so as to reduce the tendency of pulling at too great an angle upwardly from the horizontal on the front of the dredge. Even then, it is difficult to make the scraper blade dig into the sand. The present dredge 10 has a long heavy skid frame 12 extending forwardly of the rake scraper edge 14, so that the center of gravity of the dredge is well forward of this scraper edge at the bottom of the rake to assure that it is tilted forwardly at a sufficient angle to enable it to dig into the sand under the buried clams instead of just scraping or skimming over their tops.

The present dredge remains tilted downwardly in front even when starting a dredge run with a substantially high angle of the towline, because of the substantial overbalance of the heavy skid frame forward of the scraper causing a resultant downward force on the nose 16 of the skid in spite of the twoline force component being directed at an angle upwardly from the horizontal. The dredge has an attachment 18 for the towline 20 at the nose of the skid frame and another attachment 24 for the lift line 22 at the juncture of three suspension chains fixed to the top of the skid frame at three spaced points 26, 28 and 18 around the center of gravity, the attachment 18 being spaced somewhere between the centers of gravity of the empty and loaded weights in the water, so that when the dredge is lowered, the nose of the skid frame will be tilted downward to hit the bottom first, and will be tilted upward when hauled up from the bottom so as not to lose any of the clams that have been scooped onto the rake but have not yet entered the opening into the sack 30.

The sack 30 may be made of sash cord webbing or rope webbing 32 over the top portion and of interlinked steel rings 34 over the bottom portion, and its open end is fixed over the open frame 36 which is mounted under the rear end of the skid frame 12 and the bottom of which forms the back of the rake from which the tines 38 extend forwardly and downwardly to the scraper edge or blade 14. The forward end of the rake and the scraper blade 14 may be reenforced by side plate brackets 39.

Each of the vessels 40 and 42 is equipped with a pair of winches 44 and 46, and boom, pulley and control means 48 and 50 for lowering dredges overboard to their dredging positions on a clam bed and raising them to haul them aboard for unloading them into the hold of the vessel. The winches may be operated independently or together as may be desired by controlling an axial coupling 52 between them by means of a lever 54. When the winches are coupled together they may be operated by either crank 56 or 58 or by both. Conventional gear latch means 60 may be used to lock the winches in desired positions.

The winch lines are wound on the two winches in opposite directions, so that when the winches are coupled, one line will be lifted to raise its dredge for hauling it on board, while the other will be lowered to deposit its dredge on the floor of the clam bed.

As shown in the drawing, the vessel 40 has its winch lines in use as tow lines. They may let out from the winches to the desired towing distance and then made fast on board at the stern of the vessel.

Vessel 42 is shown having its winch lines 22 attached to the dredges at the lifting attachment 24 at opposite sides of the vessel to avoid fouling. The lower dredge is shown in normal starting position when lowered to the bottom of a clam bed 62. The upper dredge is shown tilted sideways and out of its normally suspended position merely to show it in better perspective to more clearly bring out its construction.

In performing the present novel method of clam fishing, one vessel, e.g. 40 serves as a towing vessel for the dredges, while the other 42 operates directly over the clam bed being dredged, until it is fully loaded, by hauling in a loaded dredge at one side of the vessel, while lowering an empty one to the dredging surface at the other side of the vessel, so that one dredge is substantially continuously dredging, until the hold of vessel 42 is full; then the vessel 40 pulls in behind the loaded vessel and the lines attached to the tow line attachments are exchanged with those attached to the left line attachments while the vessels are within close range, and vessel 42 takes up the towing duties by moving ahead to the desired towing distance and making fast its tow lines at the stern; while vessel 40 now takes up its dredge lowerings and raising operations at the end of the tow lines, until its hold is filled, whereupon the dredges are stowed away on board ship, the lines are hauled in and the loaded vessels proceed to their ports.

The cooperation of two vessels, each provided with a pair of connectable winches for simultaneous operation of two dredges at opposite sides of the vessel by alternately lowering the empty dredge to dredging position first at one side then the other while hauling in the loaded dredge at the opposite side to unload it into the hold while the other dredge is gathering its load, saves a considerable amount of time and effort over presently known methods of clam fishing with dredges, which requires towing and hauling in of the dredges by the same vessel. This means an expediture of several times as much effort and an unnecessary loss of much time, because the tow line distance is usually several times the depth of the water over the clam beds, and the torque on the winches in their operation is not counterbalanced by any oppositely wound dredge line as in the present new counterbalanced method of operating two winches, as well as keeping one dredge in dredging operation substantially continuously.

Many obvious modifications in details and arrangement of parts may obviously be made in this novel construction and method without departing from the spirit and scope of the present invention, as defined in the claims.

The trailing vessel 42 as shown in FIG. 1, may be towed by the leading vessel 40 by means of a tow line 61, or it may maintain its position under its own power.

What is claimed is:

1. The method of fishing clams and other shellfish, comprising the use of two fishing vessels and two dredges, there being a winch, a boom, a line and pulleys for each dredge on each vessel, said method including simultaneously towing both of said dredges by separate tow lines from one of said vessels at a time, while loading the other vessel at a distance back of said towing vessel substantially the length of said tow lines, connecting the dredge winches on said other vessel for simultaneous operation to alternately lower the empty dredge overboard at one side of the vessel and haul in the loaded dredge at the other side so as to unload it into the hold until the vessel is fully loaded, then reversing the operations of the vessels until the first towing vessel is also fully loaded before both vessels return to port.

2. The method as defined in claim 1, the reversing step being accomplished by keeping the emptied dredge on board ship, disconnecting the dredge winches for independent operation, hauling in the other dredge and emptying it into the hold and keeping it on board, unleashing towlines from the dredges and replacing them by the winch lines removed from the lift chains on the corresponding dredges, and meanwhile bringing the empty vessel around to the stern of the loaded vessel, and hauling in the winch lines from the empty vessel on to the loaded vessel and leashing their ends to the lifting chains of the dredges on corresponding sides, so that they can be hauled off the loaded vessel, pulling in one of said dredges on board the empty vessel, sailing ahead with the loaded vessel while letting out the winch lines thereon until the desired tow distance is reached, making the winch lines fast at the stern to provide a strong tow hitch for the dredges, then resuming the dredge lowering and lifting and vessel loading operations and continuing the dredging until the trailing vessel is fully loaded.

3. A fishing vessel equipped with a pair of winches and separate booms, pulleys and lines for raising and lowering loads at opposite sides of the vessel, means for selectively connecting said winches together for simultaneous operation of said lines in opposite directions with respect to lowering and raising said loads at the ends of said lines at said opposite sides of the vessel, at least one dredge having a long straight skid frame extending forwardly thereof, with a towline hitching means at its front end, a rake extending downwardly and forwardly from the bottom of an open frame fixed to the under side at the rear end of said skid, said rake having spaced tines and a scraper blade strip attached to their leading ends, a sash cord and interlinked steel ring webbing sack having its open end fixed over said open frame for receiving the shell fish as they are scooped up by the rake and moved up the tines through said open frame, and lifting line hitching chains attached to the top of said skid frame at points spaced around the center of gravity of said dredge wall forward of said rake for stabilizing it in a laterally substantially level position with its front end tilted down when empty, as it is lowered to the bottom of a clam bed.

4. A fishing vessel equipped with a pair of winches and separate booms, pulleys and lines for raising and lowering loads at opposite sides of the vessel, means for selectively connecting said winches together for simultaneous operation of said lines in opposite directions with respect to lowering and raising said loads at the ends of said lines at said opposite sides of the vessel, two dredges, each dredge having a substantially long skid frame with a scoop rake and webbing sack mounted at its rear end, the center of gravity of the empty dredge being well forward of said rake, a tow line attachment means at the front end of said skid frame, and a lift line attachment substantially above and between the centers of gravity of said dredge when empty and when loaded.

References Cited

UNITED STATES PATENTS

| | | | |
|---|---|---|---|
| 1,001,700 | 8/1911 | Snow | 37—119 |
| 1,168,293 | 1/1916 | Emmons | 37—119 |
| 2,648,918 | 8/1953 | Mazzella | 37—55 |
| 2,684,549 | 7/1954 | Olden | 37—119 X |
| 3,065,562 | 11/1962 | Luketa | 43—8 |
| 3,310,894 | 3/1967 | Ball | 37—195 |

ABRAHAM G. STONE, *Primary Examiner.*

R. L. HOLLISTER, *Assistant Examiner.*